United States Patent [19]

Okamoto et al.

[11] Patent Number: 5,470,937
[45] Date of Patent: Nov. 28, 1995

[54] ANISOTROPICALLY ORIENTED PHASE DIFFERENCE COMPENSATION FILM OF A BRANCHED POLYCARBONATE

[75] Inventors: Masaya Okamoto; Shigeki Kuze; Noriyuki Kunishi, all of Ichihara; Taisuke Nakashima, Tokyo, all of Japan

[73] Assignee: Idemitsu Petrochemical Co., Ltd., Tokyo, Japan

[21] Appl. No.: 137,108

[22] PCT Filed: Feb. 25, 1993

[86] PCT No.: PCT/JP93/00237

§ 371 Date: Oct. 18, 1993

§ 102(e) Date: Oct. 18, 1993

[87] PCT Pub. No.: WO93/17358

PCT Pub. Date: Sep. 2, 1993

[30] Foreign Application Priority Data

Feb. 28, 1992 [JP] Japan ..................... 4-042800
Nov. 5, 1992 [JP] Japan ..................... 4-296162

[51] Int. Cl.$^6$ ..................... C08G 64/00
[52] U.S. Cl. ............ 528/198; 359/63; 428/412; 528/196
[58] Field of Search ............ 359/63; 428/412; 528/196, 198

[56] References Cited

FOREIGN PATENT DOCUMENTS 259702 2/1990 Japan .
2257106 10/1990 Japan .

*Primary Examiner*—James J. Seidleck
*Assistant Examiner*—Terressa M. Mosley
*Attorney, Agent, or Firm*—Frishauf, Holtz, Goodman, Langer & Chick

[57] ABSTRACT

A phase difference compensation film formed of a polycarbonate, which can be used in a liquid crystal display and which shows a decreased change in retardation caused by a temperature change at a stretch forming time due to the use of a polycarbonate having a branched structure and having a viscosity-average molecular weight of 40,000 or less as the above polycarbonate.

20 Claims, No Drawings

ANISOTROPICALLY ORIENTED PHASE DIFFERENCE COMPENSATION FILM OF A BRANCHED POLYCARBONATE

TECHNICAL FIELD

The present invention relates to a phase difference compensation Film that can be used in a liquid crystal display, etc., and particularly to a phase difference compensation Film formed of polycarbonate.

TECHNICAL BACKGROUND

In a STN (super twisted nematic) liquid crystal display, light transmitted through a STN liquid crystal cell is colored due to the birefringence properties of a STN liquid crystal. Black and white display is therefore accomplished by erasing this coloring by means of an optical member For phase difference compensation. The above optical member that has been put to practical use in a STN liquid crystal display is a liquid crystal cell for optical compensation. However, this liquid crystal cell for optical compensation has disadvantages such as a high price, a decrease in light transmittance and the requirement of a stronger light source.

It has been therefore proposed to use a polymer film having birefringence properties and high transparency (to be referred to as "phase difference compensation film" hereinafter) as the optical member For phase difference compensation in place of the liquid crystal cell for optical compensation.

As the above phase difference compensation film, Films formed of various materials are known. As films formed of polycarbonate, there are known a film which is obtained by monoaxially stretching a transparent polycarbonate film (see JP-A-63-261302) and a film which is obtained by stretch-molding a polycarbonate of high polymerization degree having a viscosity-average molecular weight of at least 40,000 (see JP-A-3-181905).

The phase difference compensation film is generally produced by first obtaining a polymer sheet by an extrusion molding method or a solvent casting method, and stretching this film by a tension-stretching method after or while the film is heated. The birefringence difference ($\Delta n$) of the phase difference compensation film to be obtained can be adjusted by properly selecting the stretch ratio in tile length direction and the stretch ratio in the width direction at a stretching time. And, the retardation ($R=\Delta n.t$) of the phase difference compensation film to be obtained can be adjusted by adjusting fin and the film thickness (t).

However, when a general transparent polycarbonate film obtained from 4,4'-dihydroxyarylalkane (e.g., bisphenol A) is used as a phase difference compensation film as described in the above JP-A-63-261302, the retardation of the phase difference compensation film to be obtained varies to a great extent even due to a change in temperature at a stretching time. There is therefore a problem that it is difficult to stably obtain a phase difference compensation film having desired properties.

The above problem can be overcome to some extent by using a polycarbonate of high polymerization degree having a viscosity-average molecular weight of at least 40,000, obtained from bisphenol A, as is described in JP-A-3-181905. However, this polycarbonate is not yet satisfactory.

It is therefore an object of the present invention to provide a phase difference compensation film which shows a small variation in retardation caused by a temperature change at a stretching time.

DISCLOSURE OF THE INVENTION

The phase difference compensation film of the present invention is characterized in that it is formed of an anisotropic orientation film of a polycarbonate having a branched structure and having a viscosity-average molecular weight of less than 40,000.

Since the above phase difference compensation film shows a small variation in retardation caused by a temperature change at a stretching time, it can be easily produced as a phase difference compensation film having a desired retardation.

PREFERRED EMBODIMENTS FOR WORKING THE INVENTION

The raw material for the phase difference compensation film of the present invention is a polycarbonate having a branched structure and having a viscosity-average molecular weight (to be sometimes abbreviated as Mv hereinafter) of less than 40,000. The reason for the limitation of Mv of the polycarbonate to less than 40,000 is as follows. That is, when Mv is 40,000 or more, the extrusion molding is very difficult, and, in a solvent casting method, the polymer solution has too high a viscosity to handle easily. Further, a crosslinked polymer is liable to be contained, and it causes gelation in forming a film. Moreover, since polycarbonates which are commercially available at present are produced by an interfacial polycondensation method, it is required to decrease the polymer concentration in a washing system when the polymer solution has a high viscosity. Therefore, the productivity decreases, and the cost increases. When Mv is less than 20,000, the extrusion molding is also difficult. Mv is hence preferably 20,000 to 35,000.

The above polycarbonate can be obtained, for example, by polymerizing a dihydric phenol and phosgene or a carbonate ester in tile presence of a branching agent under predetermined conditions. The kinds of the dihydric phenol and carbonate ester used as raw materials are not specially limited if these can give a polycarbonate having optical properties usable as a phase difference compensation film, while preferred are those which can give a polycarbonate having a visible light transmittance of about 80% or more.

Examples of the dihydric phenol include hydroquinone, 4,4'-dihydroxydiphenyl, bis(4-hydroxyphenyl)alkane, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)ketone and halogen-substituted compounds of these.

Examples of the carbonate ester include diaryl carbonates such as diphenyl carbonate and alkyl carbonates such as dimethyl carbonate and diethyl carbonate.

The branching agent for imparting the polycarbonate with a branched structure is selected from compounds having at least three functional groups such as hydroxyl, carboxyl, amino, imino, formyl, acid halide and haloformate groups. At least three functional groups of the compound may be the same or different.

Specific examples of the branching agent include phloroglucin, mellitic acid, trimellitic acid, trimellitic acid chloride, trimellitic anhydride, gallic acid, n-propyl gallate, protocatechuic acid, pyromellitic acid, pyromellitic dianhydride, α-resorcinic acid, β-resorcinic acid, resorcinaldehyde, trimellityl chloride, isatinbis(ocresol), trimellityl trichloride, 4- chloroformylphthaiic anhydride, benzophenonetetracarboxylic acid, 2,4,4'-trihydroxybenzophenone, 2,2',4,4'-tetrahydroxybenzophenone, 2,4,4'-trihydroxyphenyl ether, 2,2',4,4'-tetrahydroxyphenyl ether, 2,4,4'-trihydroxydiphenyl-2-propane, 2,2'-bis(2,4-dihydroxy)propane 2 2',4 4'-tetrahydroxydiphenylmethane 2,4,4'-trihydroxydiphenylmethane, 1-[α-methyl-α-(4'-hydroxyphenyl)ethyl] -4-[α', α'-bis(4"-hydroxyphenyl)ethyl] benzene, 1-[α-methyl-α-(4'-hydroxyphenyl)ethyl] -4-[α',α'-bis(4"-hydroxyphenyl)ethyl] benzene, α, α,α"-tris(4-hydroxyphenyl)- 1,3,5-triisopropylbenzene, 2,8-bis(2'-hydroxy-5'-methylbenzyl)-4-methylphenol, 4,6-dimethyl-2,4,6-tris(4'-hydroxyphenyl)-2-heptene, 4,6 -dimethyl-2,4,6-tris(4'-hydroxyphenyl)-2-heptane, 1,3,5-tris( 4'-hydroxyphenyl)benzene, 1,1,1-tris(4-hydroxyphenyl)ethane, 2,2-bis[4,4-bis(4'-hydroxyphenyl)cyclohexyl] propane, 2,6-bis(2'-hydroxy-5' -isopropylbenzyl)-4-isopropylphenol, bis [2-hydroxy-3-(2' -hydroxy-5'-methylbenzyl)-5-methylphenyl]methane, bis[2 -hydroxy-3-(2'-hydroxy-5'-isopropylbenzyl)-5-methylphenyl] methane, tetrakis(4-hydroxyphenyl)methane, tris(4-hydroxyphenyl)phenylmethane, 2',4',7-trihydroxyflavan, 2,4,4-trimethyl-2',4',7-trihydroxyflavan, 1,3-bis(2',4'-dihydroxyphenylisopropyl)benzene and tris(4' -hydroxyaryl)-amyl-s-triazine.

The above branching agents may be used alone or in combination of at least two of them. Particularly prefered as the branching agent are 1,1,1tris(4 -hydroxyphenyl)ethane, α,α',α"-tris(4-hydroxyphenyl)- 1,3,5-triisopropylbenzene, 1-[α-methyl-α-(4'-hydroxyphenyl)ethyl] -4-[α',α'-bis(4"-hydroxyphenyl)ethyl] benzene, trimellitic acid, isatinbis(o-cresol) and phloroglucin. In tile polycarbonate used as a raw material for the phase difference compensation film of the present invention, the content of the branching agent based on the dihydric phenol which is to constitute the basic skeleton of the resin is preferably 0.05 to 2.0 mol %. The content of the branching agent is particularly preferably 0.1 to 1.0 mol %.

The phase difference compensation film of 'the present invention can be produced similarly to a conventional method for the production of conventional phase difference compensation films except for the use of the above polycarbonate. Specifically, a sheet of the above polycarbonate is obtained first by an extrusion molding method or a solvent casting method. This sheet has a thickness of approximately 0.005 to 5 mm. Then, after or while this sheet is heated, the sheet is monoaxially or biaxially stretched by a tension stretch forming method, a compression stretch forming method, a roll calendering method, an inflation forming method, or an in-mold extrusion stretch forming method, to obtain an anisotropic orientation film, i.e., the phase difference compensation film of the present invention. The stretching ratio between a length direction and a width direction and the film thickness are properly adjusted similarly to a conventional method, whereby there can be obtained a phase difference compensation film having a desired retardation (R). The value of R is properly selected depending upon the intended use of the phase difference compensation film. The thickness of the phase difference compensation film is generally 2 μm to 3 mm.

The phase difference compensation film of the present invention, which can be produced as described above, is formed from the above polycarbonate as a raw material, the variation in retardation caused by a temperature change in stretching is small, and the variation ratio is generally −5 %/°C. or less. Therefore, phase difference compensation films having desired retardation can be easily produced.

When a polycarbonate having a branched structure is produced, generally, a polymer having an ultrahigh molecular weight or a gel-like substance (the above polymer having an ultrahigh molecular weight and the above gel-like substance are generically referred to as "foreign high MW polymer substances" hereinafter) are liable to be formed. When a polycarbonate containing these foreign high MW polymer substances is formed into a film, the foreign high MW polymer substances are flattened to cause irregular reflection. When the film is used as a phase difference compensation film, light from a liquid crystal cell is scattered, and displaying is unclear.

Therefore, the number of the foreign high MW polymer substances (size 5–50 μm) in the phase difference compensation film is preferably as small as 200 pieces/cm$^2$ or less when the phase difference compensation film is viewed as a flat surface. When the number of the foreign high MW polymer substances exceeds 200 pieces/cm$^2$, light is visually scattered and displaying by a transmission display is hence unclear. The presence of foreign high MW polymer substances having a size of less than 5 μm visually does not much matter. Foreign substances having a size of greater than 50 μm are not formed by general production methods, but they are generally from metals or sealing materials and removed in the production process.

The above phase difference compensation film is preferably produced by first preparing an organic solvent solution in which the concentration of the above polycarbonate is 1 to 30% by weight, and then removing foreign high MW polymer substances by filtration.

The above organic solvent solution whose polycarbonate concentration is 1 to 30% by weight is prepared by dissolving a predetermined amount of the polycarbonate in an organic solvent. When the polycarbonate is produced by a solution method or an interfacial polycondensation method, the above organic solvent solution is prepared by adjusting the concentration of the organic solvent solution obtained in the production process. Specific examples of the organic solvent include tetrachloroethane, trichloroethane, dichloromethane, dichloroethane, dichloroethylene, chloroform, thiophene, dioxane, tetrahydrofuran, chlorobenzene, o-, m- or p-dichlorobenzene, a mixture of at least two of these and a mixture containing any one of these as a main component.

The reason for the limitation of the concentration of the organic solvent solution to 1 to 30% by weight is that when it is less than 1% by weight, the efficiency of a filter or an apparatus for removing foreign high MW polymer substances with the filter decreases and that when it exceeds 30% by weight, the organic solvent solution has too high a viscosity to be filtered.

The filter for removing foreign high MW polymer substances from the organic solvent solution can be selected from those having withstandability against the organic solvent, and it is suitably selected from a sintered metal filter, a metal fiber filter, a resin filter (woven or unwoven fabric), a ceramics filter and a glass filter. The average opening ratio of the filter can be properly changed depending upon the size of foreign high MW polymer substances to be removed, while it is generally selected from the range of from 0.1 to 100 μm. One filter may be used, or a plurality of filters may be used in series, is preferred to feed the organic solvent solution to the filter under pressure or by means of a pump.

After foreign high MW polymer substances are removed as above, the phase difference compensation film can be produced in the same manner as described above. Specifically, the organic solvent solution can be formed into a sheet by a solvent casting method, or it can be granulated and dried according to a conventional method and then formed into a sheet by extrusion molding, whereby a polycarbonate sheet is obtained. The so-obtained sheet has a thickness of approximately 0.005 to 5 mm. Then, after or while the sheet is heated, the sheet is monoaxially or biaxially stretched by a tension stretch forming method, compression stretch forming method, a roll calendering method, an inflation forming method, or an in-mold extrusion stretch forming method, thereby to obtain an anisotropic orientation film, i.e., a phase difference compensation film. A phase difference compensation film having an intended retardation (R) can be obtained by properly adjusting the stretching ratio between a length direction and a width direction and the film thickness as above.

According to the above-described manner, there can be obtained a phase difference compensation film of the polycarbonate in which the number of foreign high MW polymer substances having a size of 5 to 50 μm is 200 pieces/cm$^2$ or less when the film is viewed as a flat surface. By decreasing the number of foreign high MW polymer substances having a size of 5 to 50 μm to 200 pieces/cm$^2$ or less, irregular reflection caused by the foreign high MW polymer substances flattened by the stretch forming decreases, and there can be obtained an advantage that the displaying is clear when the above phase difference compensation film is used in a transmission display.

Examples of the present invention will be explained hereinafter.

EXAMPLE 1

(1) Preparation of polycarbonate having branched structure

A 50-liter autoclave equipped with a stirrer was charged with 9.2 mol of bisphenol A as a dihydric phenol, 0.069 mol of 1,1,1-tris(4-hydroxyphenyl)ethane as a branching agent, 9.4 liters of a 2.0N sodium hydroxide aqueous solution and 8 liters of dichloromethane, and these contents were stirred. Phosgene was introduced by blowing for 30 minutes. Then, 0.47 mol of p-tert-butylphenyl was allowed to react, and further, 0.44 mol of bisphenol A, 0.022 mol of triethylamine and 4.5 liters of a 0.2N sodium hydroxide aqueous solution were added and allowed to react for 40 minutes. Then, an aqueous phase and an organic phase were separated, whereby a dichloromethane solution of polycarbonate oligomer was obtained.

Eight liters of the dichloromethane solution, 2.5 mol of bisphenol A, 400 g of a 7.25 wt. % sodium hydroxide aqueous solution, 0.017 mol of triethylamine and 6 liters of dichloromethane were mixed, and allowed to react for 60 minutes with stirring at 500 rpm. After the reaction, an aqueous phase and an organic phase were separated, and the organic phase was consecutively washed with water, an alkali (0.01N sodium hydroxide aqueous solution), an acid (0.1N hydrochloric acid) and water, and thereafter, dichloromethane was removed to give a flake-like polycarbonate having a branched structure.

The above-obtained polycarbonate had a viscosity-average molecular weight (Mv) of 24,500. The polycarbonate was also alkali-decomposed and measured by liquid chromatography for a proportion of 1,1,1-tris(4-hydroxyphenyl)ethane to bisphenol A as a dihydric phenol to show 0.56 mol %.

(2) Production of phase difference compensation film

The polycarbonate obtained in the above (1) was molded by an extrusion molding method to obtain polycarbonate sheets having a thickness of 2 mm, and the sheets were monoaxially (in main arrangement direction) stretched by a compression stretch forming method at a temperature of 160° C., 170° C. or 180° C. at a stretch ratio of 3 times to give three phase difference compensation films having a thickness of 0.65 mm.

Table 1 shows the birefringence difference (Δn) and retardation (R) of each phase difference compensation film. Table 1 also shows the change ratios of Rs.

Δn was measured by a polarization microscope equipped with a Derrick type condensor, and R was calculated by the following equation.

$R = \Delta n \cdot t$
$t$ ... thickness of phase difference compensation film

The change ratio of R was determined by the following equation.

Change ratio of $R$ = {(change of $R$)/[(average value of $R$) · (temperature difference)]} × 100
Change of $R$ ... ($R$ of phase difference compensation film obtained by stretch forming at 180° C.) − ($R$ of phase difference compensation film obtained by stretch forming at 180° C.)
Average value of $R$ ... Average value of $Rs$ of three phase difference compensation films
Temperature difference ... 180(°C.) − 160(°C.) = 20(°C.)

EXAMPLE 2

(1) Preparation of polycarbonate having branched structure

A flake-like polycarbonate was obtained in the same manner as in Example 1(1) except that the 1,1,1-tris(4-hydroxyphenyl)ethane as a branching agent was replaced with α, α', α''-tris(4-hydroxyphenyl)-1,3,5-triisopropylbenzene.

The above-obtained polycarbonate had Mv of 24,600. Further, the polycarbonate was measured for a content of the branching agent [α,α',α''-tris(4-hydroxyphenyl)-1,3,5-triisopropylbenzene] in the same manner as in Example 1(1) to show 0.57 mol %.

(2) Production of phase difference compensation film

Three phase difference compensation films having a thickness of 0.65 mm were obtained in the same manner as in Example 1(2) except that the polycarbonate was replaced with the above-obtained polycarbonate.

The above phase difference compensation films were measured for birefringence differences (Δn) in the same manner as in Example 1(2), and Rs and a change ratio of R were determined in the same manner as in Example 1(2). Table 1 shows the results.

EXAMPLE 3

(1) Preparation of polycarbonate having branched structure

A flake-like polycarbonate was obtained in the same manner as in Example 1(1) except that the 1,1,1-tris(4-hydroxyphenyl)ethane as a branching agent was replaced with 1-[α-methyl-α-(4'-hydroxyphenyl)ethyl]-4-[ α',α''-bis(4''-hydroxyphenyl)ethyl]benzene.

The above-obtained polycarbonate had Mv of 24,600. Further, the polycarbonate was measured for a content of the branching agent [1-[α-methyl-α-(4'-hydroxyphenyl)ethyl]-

4-[α',α"-bis(4"-hydroxyphenyl)ethyl]benzene] in the same manner as in Example 1(1) to show 0.57 mol %.

(2) Production of phase difference compensation film

Three phase difference compensation films having a thickness of 0.65 mm were obtained in the same manner as in Example 1(2) except that the polycarbonate was replaced with the above-obtained polycarbonate.

The above phase difference compensation films were measured for birefringence differences (Δn) in the same manner as in Example 1(2), and Rs and a change ratio of R were determined in the same manner as in Example 1(2). Table 1 shows the results.

EXAMPLE 4

Three phase difference compensation films having a thickness of 0.65 mm were obtained in the same manner as in Example 1(2) except that the polycarbonate was replaced with LEXAN (trade name, supplied by GE, Mv=24,800, branching agent; trimellitic acid).

The above phase difference compensation films were measured for birefringence differences (Δn) in the same manner as in Example 1(2), and Rs and a change ratio of R were determined in the same manner as in Example 1(2). Table 1 shows the results.

EXAMPLE 5

Three phase difference compensation films having a thickness of 0.65 mm were obtained in the same manner as in Example 1(2) except that the polycarbonate was replaced with MAKROLON [trade name, supplied by Bayer AG, Mv=24,100, branching agent; isatin bis(o-cresol)].

The above phase difference compensation films were measured for birefringence differences (Δn) in the same manner as in Example 1(2), and Rs and a change ratio of R were determined in the same manner as in Example 1(2). Table 1 shows the results.

EXAMPLE 6

Three phase difference compensation films having a thickness of 0.65 mm were obtained in the same manner as in Example 1(2) except that the polycarbonate was replaced with DUROLON (trade name, supplied by Idemitsu Chemical de Brazil, My=22,300, branching agent; phloroglucin).

The above phase difference compensation films were measured for birefringence differences (Δn) in the same manner as in Example 1(2), and Rs and a change ratio of R were determined in the same manner as in Example 1(2). Table 1 shows the results.

Comparative Example 1

(1) Preparation of linear polycarbonate

60 Kilograms of bisphenol A as dihydric phenol was dissolved in 400 liters of a 5% sodium hydroxide aqueous solution to prepare a sodium hydroxide aqueous solution of bisphenol A. Then, the sodium hydroxide aqueous solution of bisphenol A maintained at room temperature and dichloromethane were introduced into a tubular reaction tube having a jacket (internal diameter of reaction tube; 10 mm, tube length; 10 m) through an orifice plate at flow rates of 138 liters/hour for the sodium hydroxide aqueous solution and 69 liters/hour for the dichloromethane. At the same time, phosgene was introduced at a flow rate of 10.7 kg/hour by blowing, whereby these components were allowed to react continuously for 3 hours. In this case, cooling water was circulated through the jacket portion so that the temperature of the reaction mixture in an outlet was maintained at 25° C. Further, the drawn reaction mixture was adjusted to pH 10 to 11. The so-obtained reaction mixture was allowed to stand to separate and remove an aqueous phase, and a dichloromethane phase (220 liters) was collected. Further, 170 liters of dichloromethane was added, and the resultant mixture was fully stirred to give a polycarbonate oligomer.

53.6 Grams of p-tert-butylphenol was dissolved in 9.0 liters of the above-obtained polycarbonate oligomer. Separately, 23.5 g of sodium hydroxide was dissolved in 600 cc of water, and 5.2 cc of triethylamine was added to prepare a sodium hydroxide aqueous solution. Then, the above sodium hydroxide aqueous solution containing triethylamine was added to the above polycarbonate oligomer containing p-tert-butylphenol, and the mixture was stirred at room temperature at 500 rpm for 1 hour. After the stirring, 9.5 liters of dichloromethane and a sodium hydroxide aqueous solution of bisphenol A (containing 611 g of bisphenol A and 357 g of sodium hydroxide) were added, and the mixture was further stirred at room temperature at 500 rpm for 1 hour.

Thereafter, 5 liters of dichloromethane was added, and the resultant mixture was washed with 5 liters of water and then consecutively washed with an alkali (0.01N sodium hydroxide aqueous solution), an acid (0.1N hydrochloric acid) and water. After the washing, dichloromethane was removed to give a flake-like linear polycarbonate.

The above-obtained polycarbonate had a viscosity-average molecular weight (My) of 24,500.

(2) Production of phase difference compensation film

Three phase difference compensation films having a thickness of 0.65 mm were obtained in the same manner as in Example 1(2) except that the polycarbonate was replaced with the polycarbonate obtained in the above (1).

The above phase difference compensation films were measured for birefringence differences (Δn) in the same manner as in Example 1(2), and Rs and a change ratio of R were determined in the same manner as in Example 1(2). Table 1 shows the results.

Comparative Example 2

(1) Preparation of linear polycarbonate

A flake-like linear polycarbonate was obtained in the same manner as in Comparative Example 1(1) except that the amount of p-tert-butylphenol was changed from 53.6 g to 24.3 g.

The so-obtained polycarbonate had Mv of 45,000.

(2) Production of phase difference compensation film

Polycarbonate sheets having a thickness of 2 mm were obtained From the linear polycarbonate obtained in the above (1) by a solvent casting method, and then three phase difference compensation Films having a thickness of 0.65 mm were obtained by monoaxially (in main arrangement direction) stretching the above sheets at a stretch ratio of 3 times by a compression stretch forming method under the same conditions as those in Example 1(2).

The above phase difference compensation films were measured for birefringence differences (Δn) in the same manner as in Example 1(2), and Rs and a change ratio of R were determined in the same manner as in Example 1(2). Table 1 shows the results.

TABLE 1

| | Polycarbonate | | Stretch forming temperature (°C.) | Film thickness (t mm) | Birefringence Δn (x10⁴) | Retardation R (nm) | Change ratio of R (%/°C.) |
|---|---|---|---|---|---|---|---|
| | Branching agent | Mv | | | | | |
| Ex. 1 | A | 24,500 | 160 | 0.65 | 26.6 | 1,730 | −2.5 |
| | | | 170 | | 20.9 | 1,360 | |
| | | | 180 | | 15.9 | 1,030 | |
| Ex. 2 | B | 24,600 | 160 | 0.65 | 26.8 | 1,740 | −2.6 |
| | | | 170 | | 20.8 | 1,350 | |
| | | | 180 | | 15.7 | 1,020 | |
| Ex. 3 | C | 24,600 | 160 | 0.65 | 26.9 | 1,750 | −2.7 |
| | | | 170 | | 20.9 | 1,360 | |
| | | | 180 | | 15.7 | 1,020 | |
| Ex. 4 | trimellitic acid | 24,800 | 160 | 0.65 | 26.3 | 1,710 | −3.4 |
| | | | 170 | | 19.8 | 1,290 | |
| | | | 180 | | 13.0 | 850 | |
| Ex. 5 | isatinbis-(o-cresol) | 24,100 | 160 | 0.65 | 26.2 | 1,700 | −3.3 |
| | | | 170 | | 20.1 | 1,310 | |
| | | | 180 | | 13.2 | 860 | |
| Ex. 6 | phloro-glucin | 22,300 | 160 | 0.65 | 25.5 | 1,680 | −4.6 |
| | | | 170 | | 17.8 | 1,160 | |
| | | | 180 | | 9.4 | 610 | |
| CEx. 1 | — | 24,500 | 160 | 0.65 | 26.7 | 1,740 | −9.4 |
| | | | 170 | | 12.5 | 810 | |
| | | | 180 | | 1.3 | 84 | |
| CEx. 2 | — | 45,000 | 160 | 0.65 | 29.1 | 1,890 | −5.4 |
| | | | 170 | | 18.7 | 1,220 | |
| | | | 180 | | 8.8 | 570 | |

Ex. = Example, CEx. = Comparative Example
A: 1,1,1-tris(4-hydroxyphenyl)ethane
B: a,a',a"-tris(4-hydroxyphenyl)-1,3,5-triisopropylbenzene
C: 1-[a-methyl-a-(4'-hydroxyphenyl)ethyl]-4-[a',a"-bis(4"-hydroxyphenyl)ethyl]benzene As clearly shown in Table 1, the change ratios of retardation (R) caused by a temperature change at a stretch forming time in Examples 1 to 6 are smaller than those in Comparative Examples 1 and 2.

Hereinafter explained are Examples of the phase difference compensation film in which the number of foreign high MW polymer substances (size 5 to 50 μm) when viewed as a flat surface is decreased to 200 pieces/cm² or less.

EXAMPLE 7

(1) Preparation of organic solvent solution of polycarbonate having branched structure A dichloromethane solution of polycarbonate oligomer was obtained in exactly -the same manner as in Example 1(1). Then, 8 liters of this dichloromethane solution, 2.5 mol of bisphenol A, 400 g of a 7.25 wt. % sodium hydroxide aqueous solution, 0.017 mol of triethylamine and 6 liters of dichloromethane were mixed and allowed to react for 60 minutes with stirring at 500 rpm. After the reaction, an aqueous phase and an organic phase were separated, and the organic phase was consecutively washed with water, an alkali (0.01N sodium hydroxide aqueous solution), an acid (0.1N hydrochloric acid) and water. Thereafter, the organic phase was concentrated by removing dichloromethane by evaporation to give a dichloromethane solution having a polycarbonate concentration of 20% by weight (to be referred to as "polymer solution I" hereinafter).

(2) Removal of foreign high MW polymer substances

The polymer solution I obtained in the above (1) was Fed to a sintered metal filter (trade name: PMF-FH100, average opening 10 μm) under pressure of 1 kg/cm²G to remove foreign high MW polymer substances, whereby the polymer solution I was purified.

(3) Production of phase difference compensation film

Dichloromethane was removed from the purified polymer solution I obtained in the above (2) to give a flake-like polycarbonate. This polycarbonate had a viscosity-average molecular weight (My) of 24,500.

Then, the so-obtained polycarbonate was molded by an extrusion molding method to obtain polycarbonate sheets having a thickness of 2 mm, and the sheets were monoaxially (in main arrangement direction) stretched by a compression stretch forming method at a temperature of 160° C., 170° C. or 180° C. at a stretch ratio of 3 times to give three phase difference compensation films having a thickness of 0.65 mm.

The above phase difference compensation films were measured for birefringence differences (Δn) in the same manner as in Example 1(2), and Rs and a change ratio of R were determined in the same manner as in Example 1(2). Table 2 shows the results.

Of the three phase difference compensation films, the phase difference compensation film obtained by the stretch forming at 170° C. was visually observed to show no particular foreign high MW substances. Foreign high MW polymer substances contained in this phase difference compensation film were counted for their numbers according to sizes through a stereoscope, and Table 3 shows the results.

EXAMPLE 8

Three phase difference compensation films were obtained in the same manner as in Example 7 except that the filter was replaced with one having an average opening of 15 μm.

The above phase difference compensation films were measured for birefringence differences (Δn) in the same manner as in Example 1(2), and Rs and a change ratio of R were determined in the same manner as in Example 1(2). Table 2 shows the results.

Of the three phase difference compensation films, the phase difference compensation film obtained by the stretch forming at 170° C. was visually observed to show foreign substances slightly. However, they were not those which would cause any problem in practical use. Foreign high MW polymer substances contained in this phase difference compensation film were counted for their numbers according to sizes through a stereoscope. Table 3 shows the results.

Comparative Example 3

A polymer solution was prepared in the same manner as in Example 7(1) except that the polycarbonate concentration was increased up to 32% by weight. An attempt was made to pass the polymer solution through the filter under a pressure of 5 kg/cm$^2$G, but in vain.

Referential Example 1

A polymer solution I was prepared in the same manner as in Example 7(1). and then three phase difference compensation films were obtained in the same manner as in Example 7 except that the removal of foreign high MW polymer substances through a filter was not carried out. That is, the three phase difference compensation films were obtained in exactly tile same manner as in Example 1.

The above phase difference compensation films were measured for birefringence differences (Δn) in the same manner as in Example 1(2), and Rs and a change ratio of R were determined in the same manner as in Example 1(2). Table 2 shows the results.

Of the three phase difference compensation films, the phase difference compensation film obtained by the stretch forming at 170° C. was visually observed to show that flattened semitransparent or transparent foreign substances were present here and there and some of them were blight like scales. Foreign high MW polymer substances contained in this phase difference compensation film were counted for their numbers according to sizes through a stereoscope. Table 3 shows the results.

Referential Example 2

Three phase difference compensation films were obtained in the same manner as in Example 7 except that the filter was replaced with one having an average opening of 20 μm.

The above phase difference compensation films were measured for birefringence differences (Δn) in the same manner as in Example 1(2), and Rs and a change ratio of R were determined in the same manner as in Example 1(2). Table 2 shows the results.

Of the three phase difference compensation films, the phase difference compensation film obtained by the stretch forming at 170° C. was visually observed to show that flattened semitransparent or transparent foreign substances were present here and there and some of them were blight like scales. Foreign high MW polymer substances contained in this phase difference compensation film were counted for their numbers according to sizes through a stereoscope. Table 3 shows the results.

TABLE 2

| | Polycarbonate | | Stretch forming | Film |
|---|---|---|---|---|
| | Branching agent | Mv | temperature (°C.) | thickness (t mm) |
| Ex. 7 | A | 24,500 | 160 170 180 | 0.65 |
| Ex. 8 | A | 24,500 | 160 170 180 | 0.65 |
| CEx. 3 | A | 24,500 | — | — |
| REx. 1 | A | 24,500 | 160 170 180 | 0.65 |
| REx. 2 | A | 24,500 | 160 170 180 | 0.65 |

Ex. = Example, CEx. = Comparative Example
REx. = Referential Example
A = 1,1,1-tris(4-hydroxyphenyl)ethane

TABLE 2

| | Birefringence Δn (x10$^4$) | Retardation R (nm) | Change ratio of R (%/°C.) |
|---|---|---|---|
| Ex. 1 | 26.6 20.9 15.9 | 1,730 1,360 1,030 | −2.6 |
| Ex. 2 | 26.6 20.9 16.0 | 1,730 1,360 1,040 | −2.5 |
| CEx. 3 | — | — | — |
| REx. 1 | 26.5 20.9 16.0 | 1,720 1,360 1,050 | −2.4 |
| REx. 2 | 26.6 20.9 15.9 | 1,730 1,360 1,030 | −2.5 |

Ex. = Example, CEx. = Comparative Example
REx. = Referential Example

TABLE 3

| | Number of foreign high MW polymer substances in film Size (μm) | | | | | | | |
|---|---|---|---|---|---|---|---|---|
| | 5–10 | 11–20 | 21–30 | 31–40 | 41–50 | 50– | Total | Visual evaluation of film |
| Ex. 7 | 20 | 1 | 0 | 0 | 0 | 0 | 21 | No problem |
| Ex. 8 | 62 | 35 | 1 | 0 | 0 | 0 | 98 | Foreign substances slightly observed, but no practical problem |
| CEx. 3 | | | Non-filterable | | | | | |
| REx. 1 | 417 | 171 | 32 | 7 | 3 | 1 | 631 | Scale-like foreign substances observed |
| REx. 2 | 210 | 131 | 5 | 0 | 0 | 0 | 346 | Scale-like foreign substances observed |

As is clearly shown in Tables 2 and 3, in the phase difference compensation films obtained in Examples 7 and 8, the change ratios of retardation (R) caused by temperature changes at stretch forming time are small and the number of foreign high MW polymer substances (size 5 to 50 μm) contained in therein is less than 200 pieces/cm$^2$ when the films were viewed as flat surfaces. Further, the presence of these foreign high MW polymer substances are hardly visually observed, and these foreign high MW polymer substances cause no problem in practical use.

On the other hand, the number of foreign high MW polymer substances contained in the phase difference compensation films obtained in Referential Examples 1 and 2 exceeds 200 pieces/cm$^2$ when the films are viewed as flat surfaces. The presence of these foreign high MW polymer substances can be observed as scale-like foreign substances since light is scattered by them.

Further, as is clear from Comparative Example 3, it is difficult to filter the organic solvent solution having a polycarbonate concentration of over 30% by weight even under high pressure, and such an organic solvent solution is practically unsuitable.

As explained above, in the phase difference compensation film of the present invention, the change of retardation caused by a temperature change at a stretch forming time is small. According to the present invention, therefore, phase difference compensation films having desired retardations can be easily produced.

Further, when the number of foreign high MW polymer substances (size 5 to 50 μm) in the phase difference compensation film when the film is viewed as a flat surface is decreased to 200 pieces/cm$^2$ or less, there can be provided a phase difference compensation film of a polycarbonate which is almost free from irregular reflection.

We claim:

1. A phase difference compensation film comprising an anisotropic orientation film of a branched polycarbonate having a viscosity-average molecular weight of less than 40,000.

2. A phase difference compensation film according to claim 1 wherein the polycarbonate has a viscosity-average molecular weight of 20,000 to 35,000.

3. A phase difference compensation film according to claim 1, wherein the polycarbonate is obtained by polymerizing a dihydric phenol and phosgene or a carbonate ester compound in the presence of a branching agent having at least three functional groups which are the same or different.

4. A phase difference compensation film according to claim 3, wherein the dihydric phenol is at least one dipydric phenol selected from the group consisting of hydroquinone, 4,4'-dihydroxydiphenyl, bis (4-hydroxyphenyl) alkane, bis (4-hydroxyphenyl) cycloalkane, bis (4-hydroxyphenyl) oxide, bis (4-hydroxyphenyl) sulfide, bis (4-hydroxyphenyl) sulfone, bis(4-hydroxyphenyl)ketone and halogen-substituted compounds thereof.

5. A phase difference compensation film according to claim 3, wherein the carbonate ester compound is at least one carbonate selected from the group consisting of diaryl carbonates and dialkyl carbonates.

6. A phase difference compensation film according to claim 3, wherein the branching agent is at least one compound selected from the group consisting of 1,1,1-tris(4-hydroxyphenyl)ethane, α,α',α"-tris(4-hydroxyphenyl)- 1,3,5-triisopropylbenzene, 1-[α-methyl-α-(4'-hydroxyphenyl)ethyl] -4-[α',α"-bis(4"-hydroxyphenyl)ethyl] benzene, trimellitic acid, isatinbis(o-cresol) and phloroglucin.

7. A phase difference compensation film according to claim 1, wherein the polycarbonate is obtained by polymerizing bisphenol A and phosgene in the presence of a branching agent having at least three functional groups which are the same or different.

8. A phase difference compensation film according to claim 3, wherein the polycarbonate contains 0.05 to 2.0 mol %, based on the dihydric phenol, of the branching agent.

9. A phase difference compensation film according to claim 1, which is obtained by monoaxially or biaxially stretch forming a 0.005 to 5 mm thick sheet of a polycarbonate having a branched structure and a viscosity-average molecular weight of less than 40,000.

10. A phase difference compensation film according to claim 1, wherein foreign high molecular weight polymer substances having a size of 5 to 50 μm are present in a density of 200 pieces/cm$^2$ or less when the phase difference compensation film is viewed as a flat surface.

11. A process for the production of the phase difference compensation film according to claim 10, which comprises preparing an organic solvent solution having a polycarbonate concentration of 1 to 30% by weight and then removing foreign high molecular weight polymer substances from the organic solvent solution with a filter to produce the phase difference compensation film.

12. A process according to claim 11, wherein the organic solvent is at least one solvent selected from the group consisting of tetrachloroethane, trichloroethane, dichloromethane, dichloroethane, dichloroethylene, chloroform, thiophene, dioxane, tetrahydrofuran, chlorobenzene, o-chlorobenzene, m-chlorobenzene and p-dichlorobenzene.

13. A process according to claim 11, wherein the filter is at least one filter selected from the group consisting of a sintered metal filter, a metal fiber filter, a resin filter, a ceramics filter and a glass filter.

14. A phase difference compensation film according to claim 8, wherein the branching agent is selected from the group consisting of phloroglucin, mellitic acid, trimellitic acid, trimellitic acid chloride, trimellitic anhydride, gallic acid, n-propyl gallate, protocatechuic acid, pyromellitic acid, pyromellitic dianhydride, α-resorcinic acid, β-resorcinic acid, resorcinaldehyde, trimellityl chloride, isatinbis(o-cresol), trimellityl trichloride, 4- chloroformylphthaiic anhydride, benzophenonetetracarboxylic acid, 2,4,4'-trihydroxybenzophenone, 2,2',4,4'-tetrahydroxybenzophenone, 2,4,4'-trihydroxyphenyl ether, 2,2',4,4'-tetrahydroxyphenyl ether, 2,4,4'-trihydroxydiphenyl-2-propane, 2,2'-bis(2,4-dihydroxy)propane 2 2',4 4'-tetrahydroxydiphenylmethane 2,4,4'-trihydroxydiphenylmethane, 1-[α-methyl-α-(4'-hydroxyphenyl)ethyl] -4-[α',α'-bis(4"-hydroxyphenyl)ethyl] benzene, 1-[α-methyl-α-(4'-hydroxyphenyl)ethyl] -4-[α',α'-bis(4"-hydroxyphenyl)ethyl] benzene, α, α,α"-tris(4-hydroxyphenyl)- 1,3,5-triisopropylbenzene, 2,8-bis(2'-hydroxy-5'-methylbenzyl)-4-methylphenol, 4,6-dimethyl-2,4,6-tris(4'-hydroxyphenyl)-2-heptene, 4,6 -dimethyl-2,4,6-tris(4'-hydroxyphenyl)-2-heptane, 1,3,5-tris( 4'-hydroxyphenyl)benzene, 1,1,1-tris(4-hydroxyphenyl)ethane, 2,2-bis[4,4-bis(4'-hydroxyphenyl)cyclohexyl] propane, 2,6-bis(2'-hydroxy-5' -isopropylbenzyl)-4-isopropylphenol, bis [2-hydroxy-3-(2' -hydroxy-5'-methylbenzyl)-5-methylphenyl]methane, bis[2 -hydroxy-3-(2'-hydroxy-5'-isopropylbenzyl)-5-methylphenyl] methane, tetrakis(4-hydroxyphenyl)methane, tris(4-hydroxyphenyl)phenylmethane, 2',4',7-trihydroxyflavan, 2,4,4-trimethyl-2',4',7-trihydroxyflavan, 1,3-bis(2',4'-dihydroxyphenylisopropyl)benzene and tris(4' -hydroxyaryi)-amyl-s-triazine.

15. A phase difference compensation film according to claim 3, wherein the branching agent is selected from the group consisting of 1,1,1-tris(4-hydroxyphenyl)ethane; α,α',α"-tris(4-hydroxyphenyl)-1,3,5-triisopropylbenzene; 1-[α-methyl-α-(4'-hydroxyphenyl)ethyl] -4-[α',α'-bis(4"-hydrophenyl)ethyl]benzene; trimellitic acid; isatinbis(o-cresol) and phloroglucin; and the branching agent being in an amount of 0.1 to 1.0 mol %, based on the dihydric phenol.

16. A phase difference compensation film according to claim 3, wherein the functional group is selected from the group consisting of hydroxyl, carboxyl, amino, imino, formyl, acid halide and haloformate.

17. A phase difference compensation film according to claim 7, wherein the functional group is selected from the group consisting of hydroxyl, carboxyl, amino, imino, formyl, acid halide and haloformate.

18. A phase difference compensation film according to claim 1, wherein the polycarbonate is produced by a polymerization in the presence of a branching agent having at least three functional groups which are the same or different.

19. A phase difference compensation film according to claim 18, wherein the functional group is selected from the group consisting of hydroxyl, carboxyl, amino, imino, formyl, acid halide and haloformate.

20. A phase difference compensation film according to claim 1, wherein the film has change ratio of retardation (R) with temperature of −5%/°C. or less as defined by the formula of $$\frac{\text{change of } R}{(\text{average value of } R)(\text{temperature difference})} \times 100.$$

* * * * *